United States Patent [19]

Inagaki

[11] Patent Number: 4,754,666
[45] Date of Patent: Jul. 5, 1988

[54] POWER TRANSMISSION CONTROL SYSTEM

[75] Inventor: Toshiyuki Inagaki, Kariya, Japan

[73] Assignee: Aisin Seiki Kabushiki Kaisha, Aichi, Japan

[21] Appl. No.: 796,254

[22] Filed: Nov. 8, 1985

[30] Foreign Application Priority Data

Nov. 15, 1984 [JP] Japan ................................ 59-242065

[51] Int. Cl.⁴ ...................... F16D 19/00; F16D 21/08; F16D 25/00
[52] U.S. Cl. .................................. 74/867; 192/87.18; 192/4 C; 192/87.19
[58] Field of Search ............... 192/87.18, 87.19, 87.14, 192/87.16, 4 C; 74/867

[56] References Cited

U.S. PATENT DOCUMENTS

| | | | |
|---|---|---|---|
| 3,028,767 | 4/1962 | Wickman | 74/865 |
| 3,378,119 | 4/1968 | Schaefer | 192/4 C |
| 3,400,601 | 9/1968 | Ruhl et al. | 192/4 C X |
| 3,463,283 | 8/1969 | Stow | 192/87.19 |
| 3,543,891 | 12/1970 | Mathers | 192/4 C X |
| 3,702,648 | 11/1972 | Mori | 192/87.19 |
| 3,840,099 | 10/1974 | Higuchi et al. | 192/87.19 X |
| 3,938,637 | 2/1976 | Murakami | 192/87.19 |
| 4,129,148 | 12/1978 | Lech | 192/87.19 |
| 4,253,553 | 3/1981 | Yamada et al. | 192/87.19 X |
| 4,293,059 | 10/1981 | Lucas | 192/4 C X |
| 4,452,101 | 6/1984 | Fujioka | 192/87.18 X |
| 4,502,577 | 3/1985 | Nakamichi | 192/87.19 |
| 4,646,895 | 3/1987 | Horsch | 192/87.18 X |

FOREIGN PATENT DOCUMENTS

| | | | |
|---|---|---|---|
| 2028071 | 12/1971 | Fed. Rep. of Germany | 192/87.19 |
| 38819 | 9/1981 | Japan . | |
| 69146 | 4/1982 | Japan | 192/103 F |

*Primary Examiner*—Dirk Wright
*Attorney, Agent, or Firm*—Burns, Doane, Swecker & Mathis

[57] ABSTRACT

A power transmission control system includes a single selector valve for setting three speed ratios and neutral position disposed between a fluid pressure source and three selectively engageable fluid pressure operated clutches for obtaining three speed ratios. The selector valve prevents fluid communication between the fluid pressure source and each three clutches and permits draining of the fluid pressure within each of the three clutches when in the neutral condition thereof. The selector valve permits the communication between the fluid pressure source and a selected clutch corresponding to the driving speed ratio selected thereby and prevents the communication between the fluid pressure and the non-selected clutches and permits draining of the fluid pressure from the non-selected clutches when in the one selected position.

1 Claim, 1 Drawing Sheet

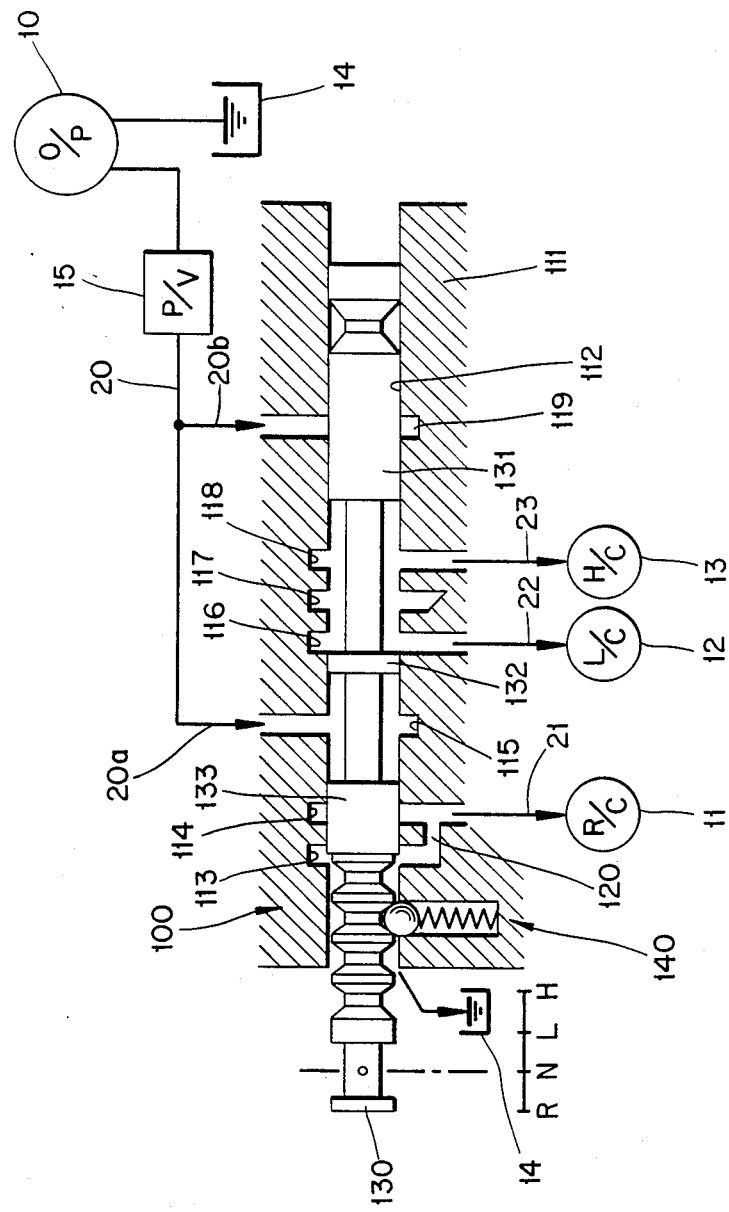

4,754,666

POWER TRANSMISSION CONTROL SYSTEM

BACKGROUND OF THE INVENTION

1. Field of the Invention

This invention relates generally to a power transmission control system and more specifically to a power transmission control system adapted to establish three driving speed ratios including two forward driving speed ratios and a single reverse driving speed ratio or a single forward driving speed ratio and two reverse driving speed ratios which is available in an industrial automobile, for example, a fork lift, etc.

2. Description of the Prior Art

A power transmission control system is disclosed in Japanese Publication No. 56(1981)-38819 in which there are two valves for selecting three driving speed ratios; one of the valves is used for selecting either the forward driving or the reverse driving, the other of the valves is used as a valve for selecting either the low speed ratio drive range or the high speed ratio drive range. However, even if a power transmission control system accomplishing two forward driving speed ratios and a single reverse speed ratio is set up, a control operation of both valves, for selecting either the forward driving or the reverse driving and for selecting either the low speed ratio drive range or the high speed ratio drive range, is required when the driving speed ratio changes. These changes require complex control systems.

SUMMARY OF THE INVENTION

It is an object of the present invention to avoid the aforementioned disadvantages of a conventional power transmission control system.

More particularly, an object of the present invention is an improved power transmission control system which can accomplish three driving speed ratios with a single selector valve and is easily operated.

Another object of the present invention is an improved power transmission control system which is of compact size.

These and other objects are accomplished by the present invention of a power transmission control system comprising a single selector valve disposed between a fluid pressure source and three selectively engageable fluid pressure operated clutches for three driving speed ratios and a valve spool for setting four range positions including three speed drive ratio and neutral and disposed within the selector valve, wherein the selector valve prevents the communication between the fluid pressure source and each three clutches and permits drainage of the fluid pressure within each of the three clutches when the spool is operated to the neutral position. Furthermore, the selector valve permits the communication between the fluid pressure source and a selected clutch corresponding to the driving speed ratio set by the spool and prevents the communication between the fluid pressure and the non-selected clutches and permits the fluid pressure from the non-selected clutches to drain when the spool operated to one position of three speed drive ratio.

Consequently, in the present invention, it is not necessary to provide two valves for selecting three driving speed ratios, but to accomplish the foregoing with a single selector valve, whereby the operation is easy and permits a compact design for arranging the valve.

The above and other objects, features and advantages of the present invention will become more apparent from the following description when taken in conjunction with the accompanying drawing.

BRIEF DESCRIPTION OF THE DRAWINGS

The Figure is a schematic diagram of a power transmission control system, according to a preferred embodiment of the present invention.

DETAILED DESCRIPTION OF THE PREFERRED EMBODIMENT

A power transmission control system comprises a fluid pressure source 10, a single selector valve 100, three clutches 11, 12 and 13, and drains 14. The selector valve 100 comprises a valve housing 111, a cylinder 112 disposed within the housing 111, a spool 130 movable within the cylinder 112, and detent means 140 defining the position of the spool 130 to the ranges of reverse R, neutral N, low speed L and high speed H. Seven ports 113, 114, 115, 116, 117, 118 and 119 are formed in the cylinder 112.

The first port 113 and the second port 114 communicate with each other via a passage 120 and communicate with the reverse clutch 11 via a passage 21. The third port 115 communicates with the oil pump 10 via a passage 20. The fourth port 116 communicates with the low clutch 12 via a passage 22. The fifth port 117 communicates with drain port 14. The sixth port 118 communicates with the high clutch 13 via a passage 23. The seventh port 119 communicates with the passage 20. A regulating valve 115 for maintaining the pressure in the passage 20 to a predetermined value is arranged in the passage 20.

The spool 130 has the three valve lands 131, 132 and 133 slidably received in a fluid-tight relationship to the cylinder 112. The first valve land 131 permits fluid communication between the seventh port 119 and the sixth port 118 via cylinder 112 when the spool 130 is operated to only the high speed position H, and prevents the communication between the seventh port 119 and the sixth port 118 when the spool 130 is operated to reverse, neutral and low speed positions R, N and L.

The second valve land 132 is positioned between the third port 115 and the fourth port 116 when the spool 130 is operated to positions N and R, whereby the communication between the ports 115 and 116 is prevented. The land 132 is positioned between the fourth port 116 and the fifth port 117 when the spool 130 is operated to position L, whereby the communication between ports 116 and 117 is prevented, and the third port 115 communicates with the fourth port 116. The land 132 is positioned between the fifth port 117 and the sixth port 118 when the spool 130 is moved to position H, whereby the communication between the ports 117 and 118 is prevented.

The third valve land 133 prevents the communication of fluid between the third port 115 and the fourth port 116 and permits fluid communication between the first port 113 and drains 114 when the spool is operated to position H. Land 133 permits fluid communications between the third port 115 and the fourth port 116 via cylinder 112 and between the first port 113 and drains 114 and prevents fluid communication between the second port 114 and the third port 115 when the spool 130 is operated to the low range or L position. In the N or neutral position, land 133 prevent fluid communication. between the second port 114 and the third port 115 and permits fluid communications between the first port 113 and drains 114. In the reverse range or R position, land 133 permits fluid communication between the second port 114 and the third port 115 via cylinder 112 and prevents communication between the first port 113 and drains 114 when the spool 130 is operated to R position.

OPERATION

When the spool 130 of selector valve 100 is operated to N position, the fluid pressure supply is to the third port 115 and the seventh port 119 from oil pump 10 via regulating valve 15, passage 20, branch lines 20a and 20b of passage 20; however, the supply of fluid pressure to reverse clutch 11, low clutch 12 and high clutch 13 is prevented by valve lands 131, 132 and 133. Furthermore, each of the passages 21, 22 and 23 are communicated with clutches 11, 12 and 13, respectively, while selector valve 100 communicates with drains 14 (passage 21 is via passage 120, first port 113 and cylinder 120, while passages 22 and 23 are via cylinder 112 and port 117), whereby each clutch 11, 12 and 13 is precisely disengaged and the neutral condition is obtained.

When the spool 130 is operated to the position R, the fluid pressure from oil pump 10 is supplied to the reverse clutch 11 via branch line 20a, third port 115, cylinder 112, second port 114 and passage 21, whereby the reverse clutch 11 is engaged and the reverse condition is accomplished. In such condition, the other clutches 12 and 13 are communicated to drains 14 by the operation of spool 130.

When the spool 130 is operated to the position L, or low range, the fluid pressure from oil pump 10 is supplied to the low clutch 12 via branch line 20a, third port 115, cylinder 112, fourth port 116 and passage 22, whereby the low clutch 12 is engaged and the low range condition is obtained. In such condition, the other clutches 11 and 13 are communicated to drain passages 14 by the operation of spool 130.

When the spool 130 is operated to the position H, or high range, the fluid pressure from oil pump 10 is supplied to the high clutch 13 via branch line 20b, seventh port 119, cylinder 112, sixth port 118 and passage 23, whereby the high range clutch 12 is engaged and the high range condition is obtained. In such condition, other clutches 11 and 12 are communicated with drain 14 by the operation of spool 130.

Obviously, many modifications and variations of the invention are possible in light of the above teachings. It is, therefore, to be understood that within the scope of the appended claims, the invention may be practiced otherwise than as specifically described herein.

What is claimed is:

1. A power transmission control system for a transmission consisting of three speed ratios including at least a single reverse driving speed ratio, comprising:
    a fluid pressure source;
    a drain;
    a first fluid pressure operated clutch for obtaining a first driving speed ratio when fluid pressure from said fluid pressure source is supplied thereinto, said first ratio being a forward high speed ratio;
    a second fluid pressure operated clutch for obtaining a second driving speed ratio when said fluid pressure is supplied thereinto, said second ratio being a forward low speed ratio;
    a third fluid pressure operated clutch for obtaining a third driving speed ratio when said fluid pressure is supplied thereinto, said third ratio being a reverse speed ratio;
    a single selector valve for selecting said first, second and third driving speed ratios and a neutral position disposed between said fluid pressure source and said first, second and third clutches, a first fluid pressure conduit connected between said selector valve and said fluid pressure source, a second fluid pressure conduit connected between said selector valve and said fluid pressure source, said selector valve having a first groove defined between first and second lands and a second groove defined between said second land and a third land, the first conduit selectively connectable to the first groove to obtain one of said reverse speed ratio and said forward low speed ratio, the second conduit selectively connectable to the second groove to obtain said forward high speed ratio, said selector valve prevents fluid communications between said fluid pressure source and said first, second and third clutches and permits the fluid communication between sadi drain and said first, second and third clutches when said selector valve is positioned to said neutral position; said selector valve operable for selecting one of said first, second and third dirving speed ratios, so as to permit fluid communication between said fluid pressure source and one of said first, second and third clutches corresponding to said one of said first, second and third driving speed ratios and prevent fluid communication between said one of said first, second and third clutches and said drain and prevent fluid communication between said fluid pressure source and remaining ones of said first, second and third clutches and permit fluid communication between said remaining ones of said clutches and said drain; and
    detent means for maintaining said selector valve in its selected positions, said detent means being exposed to fluid pressure in at least one position of the selector valve.

* * * * *